(12) United States Patent
Ebner et al.

(10) Patent No.: US 7,691,309 B2
(45) Date of Patent: Apr. 6, 2010

(54) PROCESS FOR MAKING A TOOTHBRUSH

(75) Inventors: Winfried Ebner, Freiburg (DE);
Wolf-Dieter Mueller, Buehl (DE)

(73) Assignee: GlaxoSmithKline Consumer Healthcare GmbH & Co. KG, Buehl (Baden) (DE)

( * ) Notice: Subject to any disclaimer, the term of this patent is extended or adjusted under 35 U.S.C. 154(b) by 0 days.

(21) Appl. No.: 10/591,062

(22) PCT Filed: Feb. 25, 2005

(86) PCT No.: PCT/EP2005/002111

§ 371 (c)(1),
(2), (4) Date: Oct. 2, 2007

(87) PCT Pub. No.: WO2005/084487

PCT Pub. Date: Sep. 15, 2005

(65) Prior Publication Data

US 2008/0164633 A1   Jul. 10, 2008

(30) Foreign Application Priority Data

Mar. 1, 2004   (EP) .................................. 0404583

(51) Int. Cl.
*B29C 45/14* (2006.01)
*B29C 45/34* (2006.01)

(52) U.S. Cl. ................ 264/243; 264/259; 425/546; 425/812; 249/141; 249/160

(58) Field of Classification Search .......... 425/812, 425/546; 264/243, 259; 249/141, 160
See application file for complete search history.

(56) References Cited

U.S. PATENT DOCUMENTS

| | | | | |
|---|---|---|---|---|
| 4,909,972 A | * | 3/1990 | Britz | 264/51 |
| 5,345,644 A | | 9/1994 | Gueret et al. | |
| 5,935,620 A | * | 8/1999 | Baudin | 425/522 |
| 6,306,238 B1 | * | 10/2001 | Torniainen et al. | 156/245 |
| 6,514,445 B1 | | 2/2003 | Cann et al. | |
| 2003/0037391 A1 | | 2/2003 | Pfenniger et al. | |
| 2004/0006837 A1 | | 1/2004 | Cann | |

FOREIGN PATENT DOCUMENTS

| | | | |
|---|---|---|---|
| DE | 19943599 A1 | | 3/2001 |
| DE | 10104034 A1 | * | 8/2002 |
| GB | 2391462 A | | 2/2004 |
| JP | 60 046222 A | | 3/1985 |
| JP | 2003 033953 A | | 2/2003 |
| WO | WO94/05183 | * | 3/1994 |
| WO | WO 00/15077 A | | 3/2000 |
| WO | WO 00/37232 | | 6/2000 |
| WO | WO2004/041025 | * | 5/2004 |

OTHER PUBLICATIONS

Patent Abstract of Japan, vol, 009, No. 176 (M-398 dated Jul. 20, 1985.
Patent Abstract of Japan, vol. 2003, No. 06 dated Jun. 3, 2003.

* cited by examiner

*Primary Examiner*—Joseph S Del Sole
*Assistant Examiner*—Robert Dye
(74) *Attorney, Agent, or Firm*—Nora Stein-Fernandez; Theodore R. Furman

(57) ABSTRACT

This invention relates to a process for making toothbrushes, in particular an injection moulding process.

5 Claims, 6 Drawing Sheets

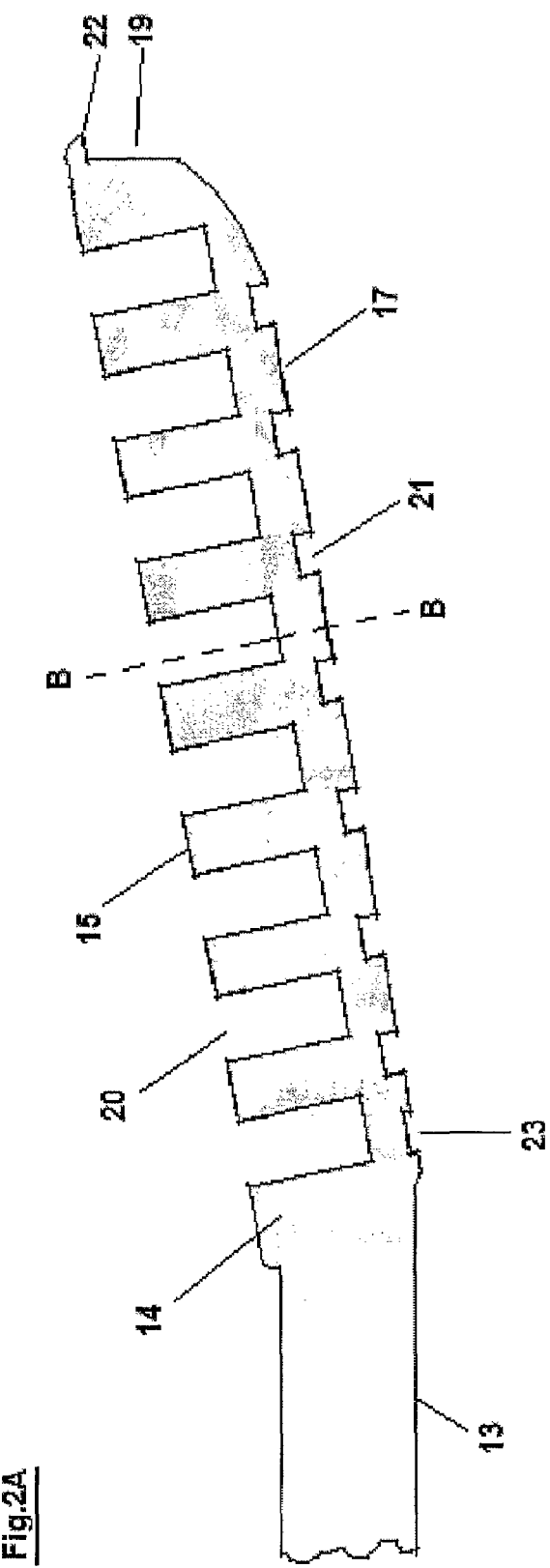
Fig.2
Fig.2A
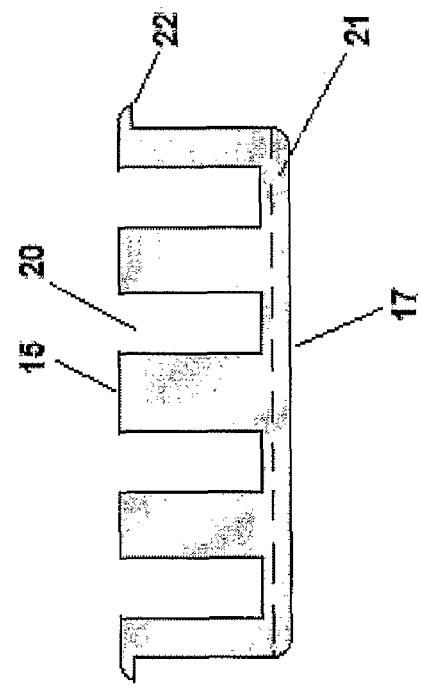
Fig.2B

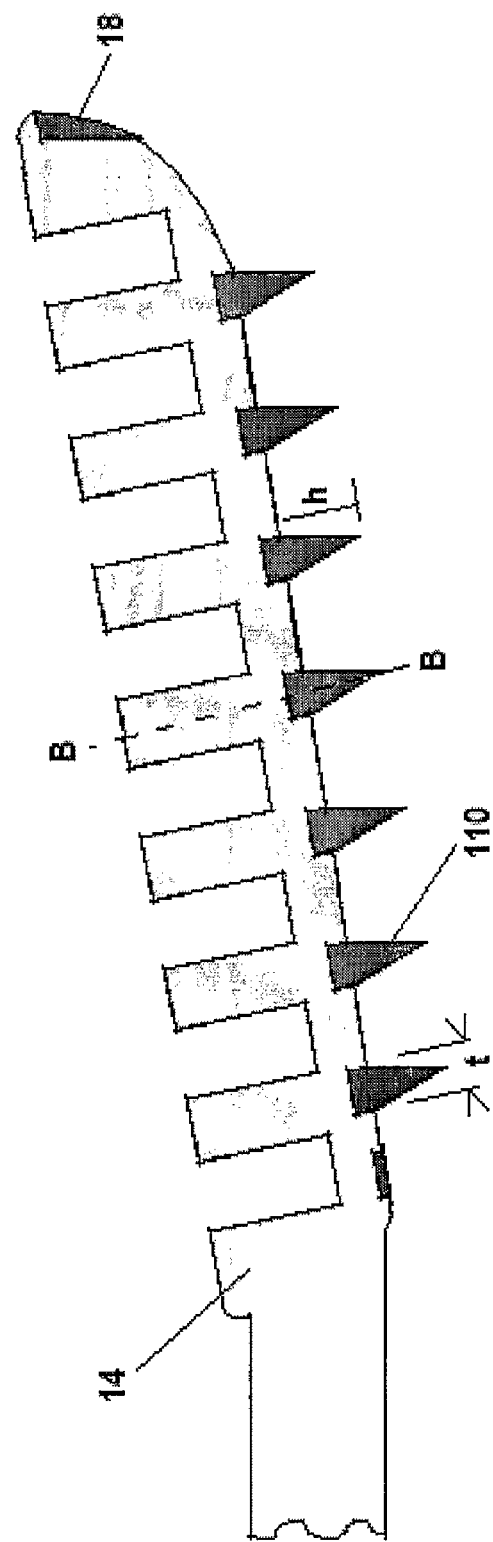
Fig. 3
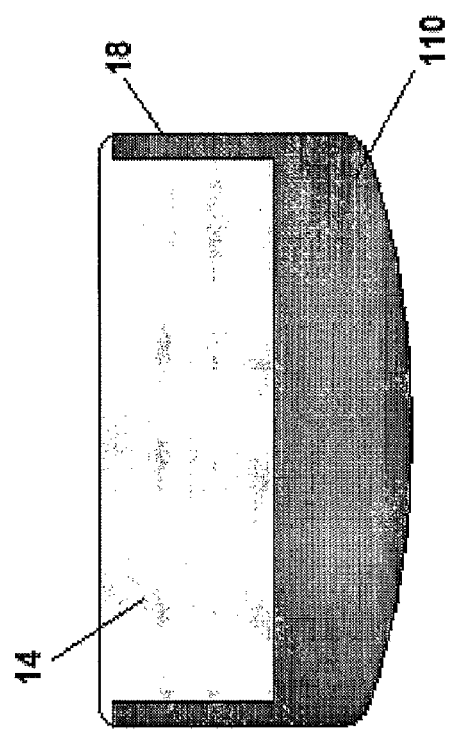
Fig. 3A
Fig. 3B

PROCESS FOR MAKING A TOOTHBRUSH

This application is a §371 national phase entry of International Application No. PCT/EP2005/002111, filed Feb. 25, 2005.

This invention relates to a process for making toothbrushes, in particular an injection moulding process.

BACKGROUND OF THE INVENTION

Toothbrushes are well-known articles and normally comprise a head and a grip handle, generally with a narrowed neck region in between, all arranged along a longitudinal head-handle direction. Normally toothbrushes are made primarily of a plastic material, e.g. a polypropylene or styrol acryl nitrol ("SAN"). Many are so called two-component toothbrushes comprising a part made of plastic, e.g. the head and the main structure or "skeleton" of the handle, and a part made of a softer resilient elastomer, such as a thermoplastic elastomer e.g. Santoprene™ e.g. comprising part of the grip handle, to enhance grip, aesthetic appearance or to influence flexibility. Such toothbrushes are disclosed for example in U.S. Pat. No. 5,054,154 and EP-A-0 336 641 among others. Toothbrushes are also known incorporating one or more elastomer rib on the back of the brush head (opposite surface to that on which are mounted the bristles)", e.g. WO-A-04/041025, for tongue cleaning. A toothbrush of this type is sold commercially by the present applicant under the name Aquafresh extreme clean™.

Toothbrushes are normally made by a process in which the plastic material part of their structure is first made, generally by injection moulding. Then this plastic part is enclosed in a mould cavity which defines the shape of the elastomer material part, and the elastomer material of the second component in a fluid state is injected into this mould cavity to form the elastomer material part. Normally the plastic material is formed with one or more cavity to receive this second material. U.S. Pat. No. 3,633,237 discloses such a toothbrush head having cavities in the plastic material part with which the elastomer part can engage.

Normally such injection moulds are mould assemblies comprising one or more, generally two, mould blocks each with a part mould cavity therein, which when brought together in the assembled mould mate so that their part mould cavities combine to form a complete mould cavity between them, the surface across which they mate being known in the art as the "split line", and termed herein the "primary split line". Such processes are well known. WO-A-02/13656 for example describes such a process and suitable moulding machinery for its performance being a so called stack mould. It is also known for injection moulds to incorporate vents for the escape of air or other gases within the mould cavity, see for example DE-A-101 04 034, JP-A-2122910, JP-A-60046222, and U.S. Pat. No. 3,555,619.

There is a problem in making toothbrush heads having an elastomer material part in the form of elastomer ribs extending transverse to the longitudinal direction, because during the injection of the elastomer material into the mould cavity air can become trapped in the parts of the mould cavity which define these ribs, for example as fluid elastomer material flows simultaneously from transversely opposite ends of these parts to trap air between these ends. This can result in voids in the so-formed elastomer part. It is an object of this invention to address this problem by providing a process and mould in which inter alia venting of air is improved, and flow of fluid elastomer material in the mould cavity is improved.

SUMMARY OF THE INVENTION

Accordingly this invention provides a process for making a toothbrush head, comprising;

providing a plastic material head part having a first surface in which bristles are mounted or are to be mounted, and having an opposite surface on which an elastomer material part is to be formed, the first and second surfaces being distanced by a side surface, enclosing the head part in an injection mould cavity formed by combination of a first and second part mould cavity formed in respective first and second mould blocks which mate at a primary split line, the injection mould cavity defining at least part of the shape of the elastomer part to be formed, introducing a thermoplastic elastomer material into the injection mould cavity to thereby form the elastomer material part, characterised in that:— the mould block is provided with means to allow air to vent from the injection mould cavity during introduction of the thermoplastic elastomer material into the injection mould cavity other than via the primary split line.

DETAILED DESCRIPTION OF THE INVENTION

The plastic material head part may be provided by a conventional injection moulding process of the type used in the toothbrush art to manufacture plastic material parts of toothbrushes.

By providing such means to allow air to vent from the injection mould cavity during introduction of the thermoplastic elastomer material into the injection mould cavity other than via the primary split line air can escape from the cavity, and void formation can be reduced or eliminated. By "air" is included any gaseous atmosphere in the mould cavity. By "vent" is meant escape to the ambient environment.

In an embodiment of this process the first part mould cavity encloses at least part of the first surface and the second part mould cavity encloses at least part of the second surface and defines at least part of the elastomer part to be formed, and the second mould block is provided with means to allow air to vent from the injection mould cavity during introduction of the thermoplastic elastomer material into the injection mould cavity other than via the primary split line.

In an embodiment of the process the first and second mould blocks mate at a primary split line which intersects the head part at the edge surface, between the first and second surfaces.

The means to allow air to vent from the injection mould cavity during introduction of the thermoplastic elastomer material into the injection mould cavity other than via the primary split line may comprise a conduit communicating between the injection mould cavity and the outside of the mould block. Such a conduit is suitably wide enough to allow air to vent through but too narrow to allow significant flow of fluid elastomer material through.

Such a conduit may communicate between the second part mould cavity, e.g. a concavity thereof, and the outside of the mould block.

Such a conduit may comprise a slot extending in the toothbrush longitudinal direction, for example providing communication between the second part mould cavity, e.g. plural concavities therein, and the outside of the mould block.

In an embodiment such a conduit, e.g. slot, may be provided by a second mould block which comprises at least two part second mould blocks which mate at a second mould block split line which extends in the toothbrush longitudinal direction, preferably in a direction perpendicular to a plane between the first and second surfaces, preferably in a direction parallel to the toothbrush longitudinal direction.

Such a second mould block split line provide a conduit which may be sufficiently wide to allow the venting of air from the second part mould cavity but sufficiently narrow that no fluid elastomer material may escape. The two second part mould blocks are however fixed rigidly together against pressures and stresses of toothbrush manufacture, e.g. by bolts or an external frame.

Alternatively but less preferably such a slot may be provided by a first mould block which comprises at least two part second mould blocks which mate at a second mould block split line which extends in the toothbrush longitudinal direction.

In an embodiment of the process, the elastomer part comprises one or more rib having an elongate direction across the longitudinal direction, and extending from the second surface in a height direction perpendicular to a plane between the first and second surfaces, and the second part mould cavity may comprise one or more concavity defining the shape of such a rib.

Such a rib may for example be in the form of a flexible lamella. Such a lamella may for example have a section, cut in the toothbrush longitudinal direction which tapers to be narrower remote from the second surface, e.g. of a wedge profile. Typically a height dimension of ca. 1-3 mm is suitable. In their elongate direction, as seen in plan looking onto the second surface, such a rib may for example be straight, may for example be curved e.g. in an "S" shape or e.g. an arc with its convex side facing away from the handle, or for example be chevron shaped e.g. in a "V" shape with the "V" pointing away from the handle, or some other shape.

Therefore in a preferred form of the process of the invention an elastomer material part comprising plural ribs each having an elongate direction across the longitudinal direction, and extending from the second surface in a height direction perpendicular to a plane between the first and second surfaces, is formed on the second surface of the head by a process comprising:— enclosing the head part in an injection mould cavity formed by combination of a first and second part mould cavity formed in respective first and second mould blocks which mate at a primary split line, the first part mould cavity enclosing at least part of the first surface, and the second part mould cavity enclosing at least part of the second surface and defining at least part of the elastomer part to be formed, the second part mould cavity comprising one or more concavity defining the shape of the plural ribs, the second mould block comprising at least two part second mould blocks which mate at a second mould block split line which extends in the toothbrush longitudinal direction, preferably in a direction perpendicular to a plane between the first and second surfaces, and introducing a thermoplastic elastomer material into the second mould cavity to thereby form the elastomer material part.

In such a process air can vent from the second part mould cavity during introduction of the thermoplastic elastomer material into the second mould cavity via the second mould block split line.

In the process of the invention the thermoplastic elastomer material may be introduced into the second mould cavity by means of a conventional injection port of a type well known in the toothbrush making art, for example as generally disclosed in EP-A-0 749 281. Such an injection port may pass through the second or first part mould block. A preferred thermoplastic elastomer material is the SEBS material TF3AAH from the supplier Kraiburg.

A further aspect of this invention provides an apparatus, suitable to perform the above process, for making a toothbrush head, comprising:— an injection mould which comprises first and second mould blocks which include a respective first and second part mould cavity and which mate at a primary split line, so that the part mould cavities combine to form a mould cavity suitable to enclose a plastic material head part having a first surface in which bristles are mounted or are to be mounted, and having an opposite surface on which an elastomer material part is to be formed, the first and second surfaces being distanced by a side surface, the mould cavity defining at least part of the elastomer part to be formed, the injection mould being adapted for introduction of a thermoplastic elastomer material into the second mould cavity to thereby form the elastomer material part, characterised in that:— the mould block is provided with means to allow air to vent from the mould cavity during introduction of the thermoplastic elastomer material into the mould cavity other than via the primary split line.

In an embodiment of this apparatus the first part mould cavity is adapted to enclose at least part of the first surface and the second part mould cavity is adapted to enclose at least part of the second surface and to define at least part of the elastomer part to be formed, and the second mould block is provided with means to allow air to vent from the injection mould cavity during introduction of the thermoplastic elastomer material into the injection mould cavity other than via the primary split line.

In an embodiment the first and second mould blocks mate at a primary split line which, when the head part is enclosed in the mould cavity, intersects the head part at the edge surface, between the first and second surfaces.

In an embodiment the second part mould cavity comprises one or more concavity defining the shape of an elastomer part which comprises one or more rib having an elongate direction across the longitudinal direction, and extending from the second surface in a height direction perpendicular to a plane between the first and second surfaces.

Such a concavity may be of a shape complementary to a rib which for example is in a form as discussed above in relation to the process.

In an embodiment the mould block may include a conduit communicating between the mould cavity and the outside of the mould block. Such a conduit is suitably wide enough to allow air to vent along but too narrow to allow significant flow of fluid elastomer material along.

Such a conduit may communicate between the second part mould cavity, e.g. a concavity thereof, and the outside of the mould block.

Such a conduit may comprise a slot extending in the toothbrush longitudinal direction, for example providing communication between plural concavities and the outside of the mould block.

In an embodiment such a conduit, e.g. slot, may be provided by a second mould block which comprises at least two second part mould blocks which mate at a second mould block split line which extends in the toothbrush longitudinal direction, preferably in a direction perpendicular to a plane between the first and second surfaces, preferably in a direction parallel to the toothbrush longitudinal direction. Such a second mould block split line may be sufficiently wide to allow the venting of air from the second part mould cavity but sufficiently narrow that no fluid elastomer material may escape. The two second part mould blocks are however fixed rigidly together against pressures and stresses of toothbrush manufacture, e.g. by bolts or an external frame.

Alternatively but less preferably such a slot may be provided by a first mould block which comprises at least two part second mould blocks which mate at a second mould block split line which extends in the toothbrush longitudinal direction.

Therefore in a preferred apparatus of this invention:— the first and second mould blocks mate at a primary split line which, when the head part is enclosed in the mould cavity, intersects the head part at the edge surface, between the first and second surfaces, the second part mould cavity comprises one or more concavity defining the shape of an elastomer part which comprises plural ribs having an elongate direction across the longitudinal direction, and extending from the second surface in a height direction perpendicular to a plane between the first and second surfaces, the second mould block comprises at least two second part mould blocks which mate at a second mould block split line which extends in the toothbrush longitudinal direction.

In the process and apparatus of this invention the injection mould cavity may completely enclose all the surface(s) of the head part upon which the elastomer part is to be formed, but need not completely enclose other parts of the toothbrush.

In the process and apparatus of the invention the means to introduce thermoplastic elastomer material into the second mould cavity may comprise a conventional injection port of a type well known in the toothbrush making art, for example as generally disclosed in EP-A-0 749 281. Such an injection port may pass through the second part mould block.

In another aspect of this invention advantageous injection moulding conditions for the thermoplastic elastomer material have been devised which are particularly suited to the manufacture of toothbrush heads of the type discussed herein.

Accordingly this aspect provides a process for making a toothbrush head, comprising;

providing a plastic material head part having a first surface in which bristles are mounted or are to be mounted, and having an opposite surface on which an elastomer material part is to be formed, the first and second surfaces being distanced by a side surface, enclosing the head part in an injection mould cavity defining at least part of an elastomer part, particularly an elastomer material part which comprises one or more rib having an elongate direction across the longitudinal direction, and extending from the second surface in a height direction perpendicular to a plane between the first and second surfaces to be formed therein, introducing a thermoplastic elastomer material into the injection mould cavity to thereby form the elastomer material part, characterised in that the fluid thermoplastic elastomer material is injected into the injection mould cavity at a temperature of 240-260° C.

It is found that injecting the thermoplastic elastomer material into the injection mould cavity at this temperature range, rather than the 180-190° C. normally used (though sometimes up to 220° C. is used) enhances the adhesion of the elastomer material, e.g. the elastomer materials mentioned herein, to the commonly used plastic materials of the plastic material part mentioned above, and also enhances the flow of the fluid elastomer material within the mould cavity.

This invention provides a further process for making a toothbrush head, comprising;

providing a plastic material head part having a first surface in which bristles are mounted or are to be mounted, and having an opposite surface on which an elastomer material part is to be formed, the first and second surfaces being distanced by a side surface, enclosing the head part in an injection mould cavity defining at least part of an elastomer part, particularly an elastomer material part which comprises one or more rib having an elongate direction across the longitudinal direction, and extending from the second surface in a height direction perpendicular to a plane between the first and second surfaces to be formed therein, introducing a thermoplastic elastomer material into the second mould cavity to thereby form the elastomer material part, characterised in that subsequent to the injection of the thermoplastic elastomer material into the injection mould cavity, e.g. at the above-mentioned temperature of 240-260° C., the head part with the so-formed elastomer material part is ejected from the mould cavity at a temperature above 20° C., preferably above 25° C., preferably between 30-40° C., e.g. at around 35° C.

It is found that ejecting the so-formed product at this temperature range, rather than the 18° C. normally used enhances the adhesion of the elastomer material to the commonly used plastic materials of the plastic material part mentioned above.

A preferred thermoplastic elastomer material for the processes of these latter two aspects is a SEBS material, particularly TF3AAH from the supplier Kraiburg.

For use in the processes, and in the apparatus, of the invention the second surface of the head part, on which the elastomer material part is formed, may incorporate structural features to enhance bonding of the elastomer material thereto. For example in the case of the above-mentioned rib such a structural feature may comprise a groove or discontinuous line of apertures in the second surface corresponding to the elongate direction of the rib.

BRIEF DESCRIPTION OF THE DRAWINGS

The process and apparatus of this invention will now be described by way of example only with reference to FIGS. 1 to 5 which show:—

FIG. 2 Longitudinal and cross sections of the head part of the toothbrush shown in FIG. 1.

FIG. 3 Longitudinal and cross sections of the head part of the toothbrush of FIG. 1 with the elastomer part in place.

Parts Referred to in FIGS. 1-6

Figure 1:
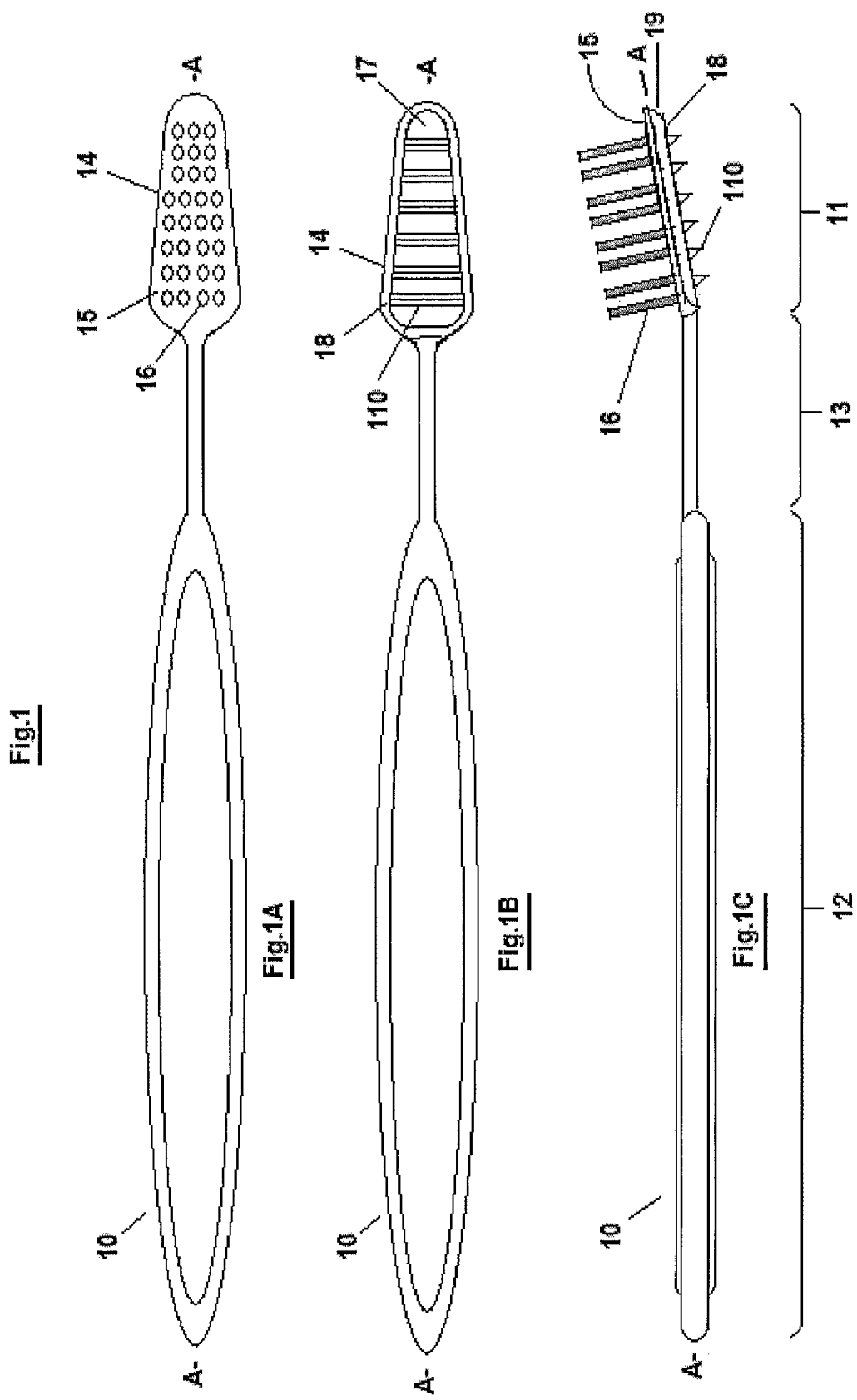
FIG. 1 A toothbrush made by the process of this invention.

10 toothbrush
11 head
12 grip handle
13 neck region
14 plastic material head part
15 first surface
16 tufts of bristles
17 opposite surface
18 elastomer material part
19 side surface
110 plural elastomer ribs
20 bristle holes
21 grooves
22 flange 23 flow channel
30 part of an injection mould
31 mould cavity
32 first mould block
33 second mould block
33A, 33B second part mould blocks
34 first part mould cavity
35 second part mould cavity
36 primary split line
37 concavity
38 injection moulding port
39 second mould block split line
40 bubble point Referring to FIG. 1, a toothbrush 10 is shown which comprises a head 11 and a grip handle 12, with a narrowed neck region 13 in between the head 11 and handle 12, all arranged along a longitudinal head-handle direction A—A. The head 11 comprises a plastic material head part 14 which has a first surface 15 in which tufts 16 of bristles are mounted. The head part 14 has a second opposite surface 17 on which an elastomer material part 18 has been formed. The first and second surfaces 15, 17 are distanced by a side surface 19. FIG. 1A is a plan view looking down onto the first surface 15. FIG. 1C is a side view.

The head part 14 has been formed integrally with handle 12 and neck 13 of polypropylene by injection moulding.

The elastomer material part 18 is formed of the SEBS thermoplastic elastomer material Kraiburg TF3AAH™. The elastomer part 18 comprises plural elastomer ribs 110. FIG. 1 shows that the ribs 110 are arranged sequentially longitudinally along the second surface 17 of head 11. Ribs 110 are in the form of flexible lamellae having an elongate direction transversely across the longitudinal direction A—A, and extending from the second surface 17 in a height direction perpendicular to a plane between the first and second surfaces, with a height dimension "h" greater than their thickness dimension "t" (shown more clearly in FIG. 3) as measured in the toothbrush longitudinal direction. The lamellae have a section, cut in the toothbrush longitudinal direction A—A which tapers as seen in FIGS. 1C and 3, to be narrower remote from the second surface 17, i.e. being of a wedge profile. In their elongate direction, as seen in plan in FIG. 1B looking onto the second surface 17, ribs 110 are shown straight, but may be curved in an arc with its convex side facing away from the handle i.e. to the right as seen in FIG. 1.

Figure 4:
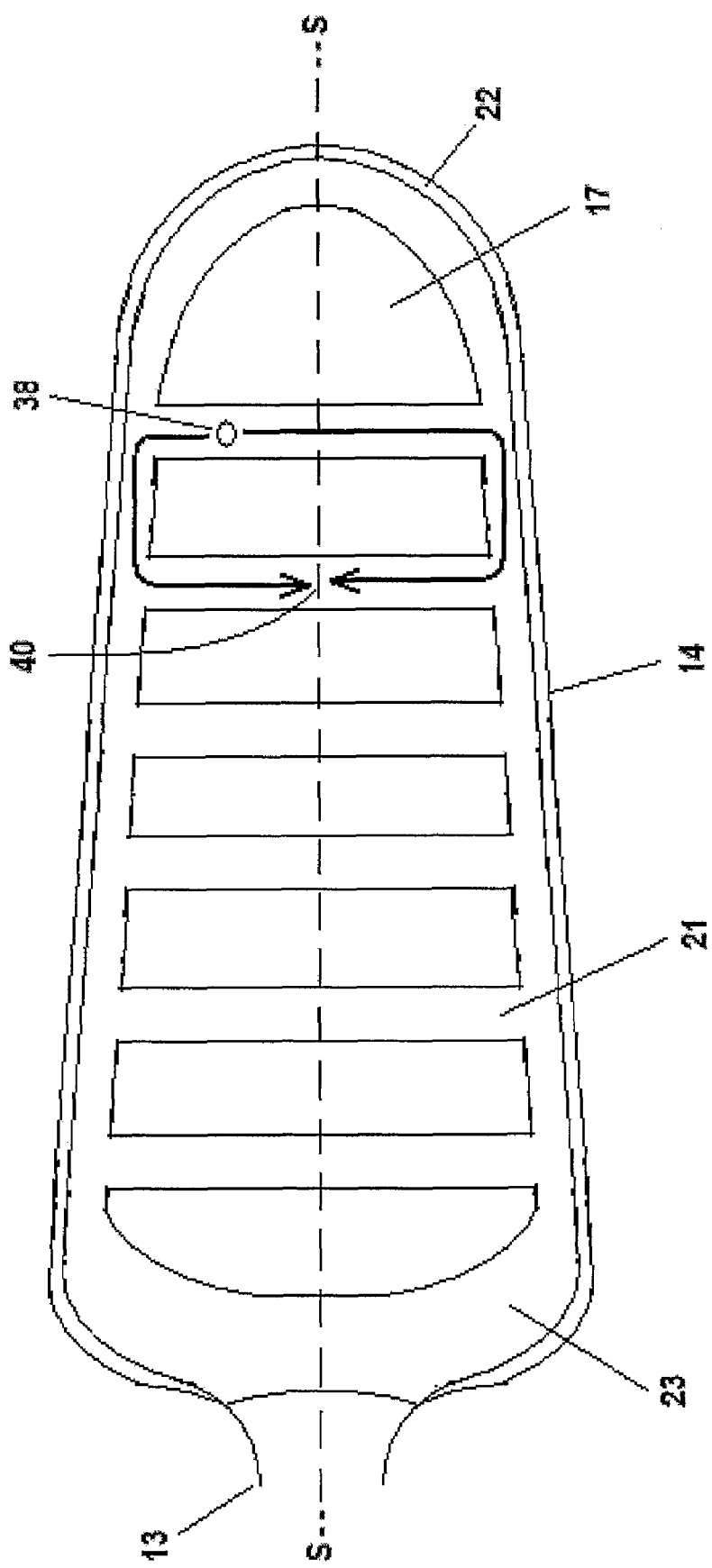
FIG. 4 Plan view of the second surface of the head part of the toothbrush shown in FIG. 1.

FIGS. 2, 3 and 4 show the construction of head part 14 in more detail. FIGS. 2A and 3A show longitudinal sections and FIGS. 2B and 3B showing cross sections across the longitudinal axis A—A about the lines B—B of FIGS. 2A and 3A. FIG. 4 shows a plan view of the surface 17. Features shown in FIG. 1 are numbered correspondingly. FIGS. 2 and 3 show conventional bristle holes 20 which have been formed in the plastic material of surface 15 of head part 14 using bristle pins in a conventional manner. Bristle tufts 16 are subsequently fixed into holes 20. In the opposite surface 17 are grooves 21 which facilitate the anchoring of the lamellae 110 into surface 17. Grooves 21 extend transversely to the longitudinal axis A—A in positions corresponding to lamellae 110. Around the side surfaces 19 of head part 14 are flanges 22. A flow channel 23 also extends transversely across surface 17 and as seen in FIG. 4 around the edge of second surface 17.

Figure 5:
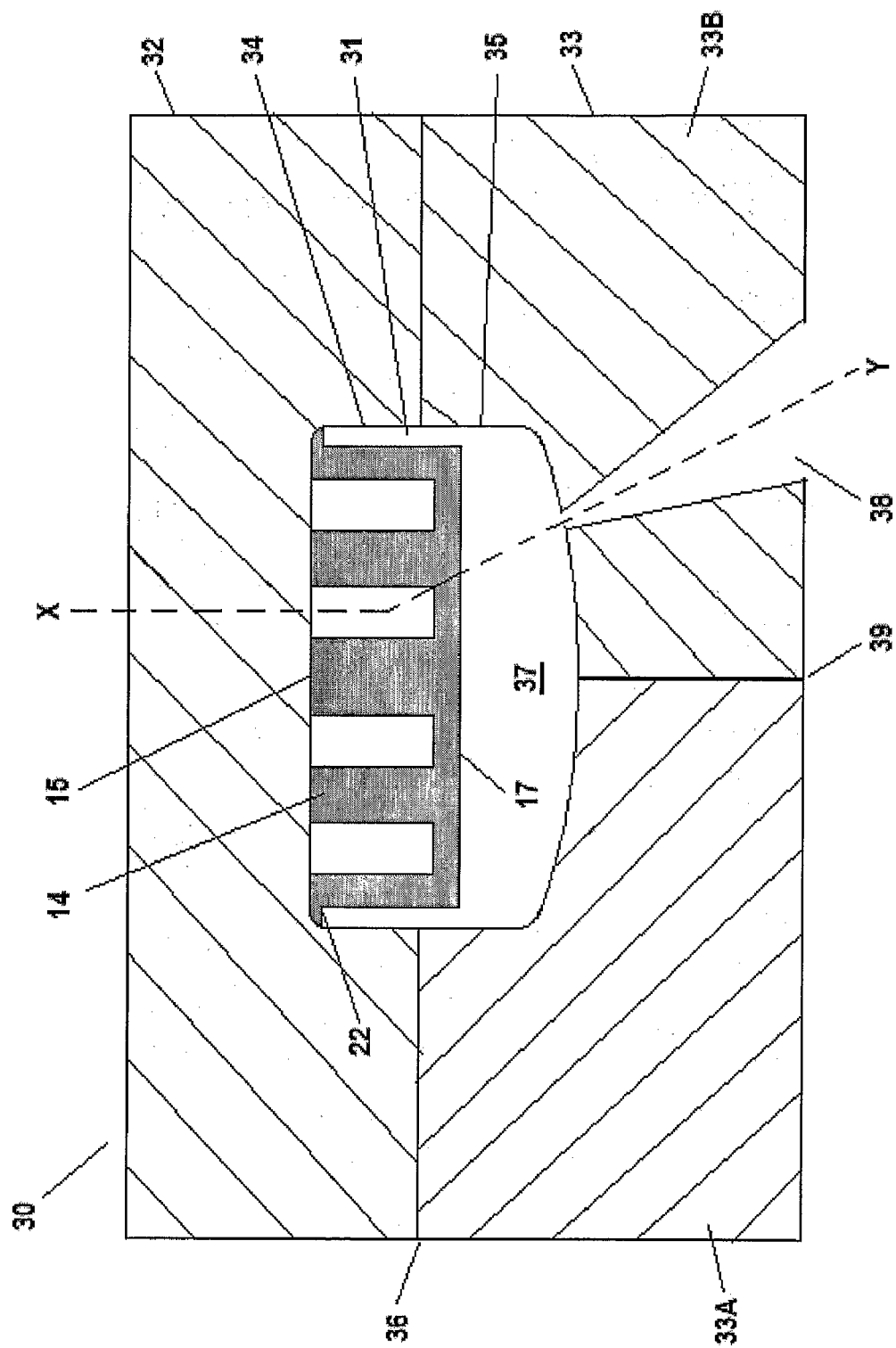
FIG. 5 Cross section through an injection mould.
Figure 6:
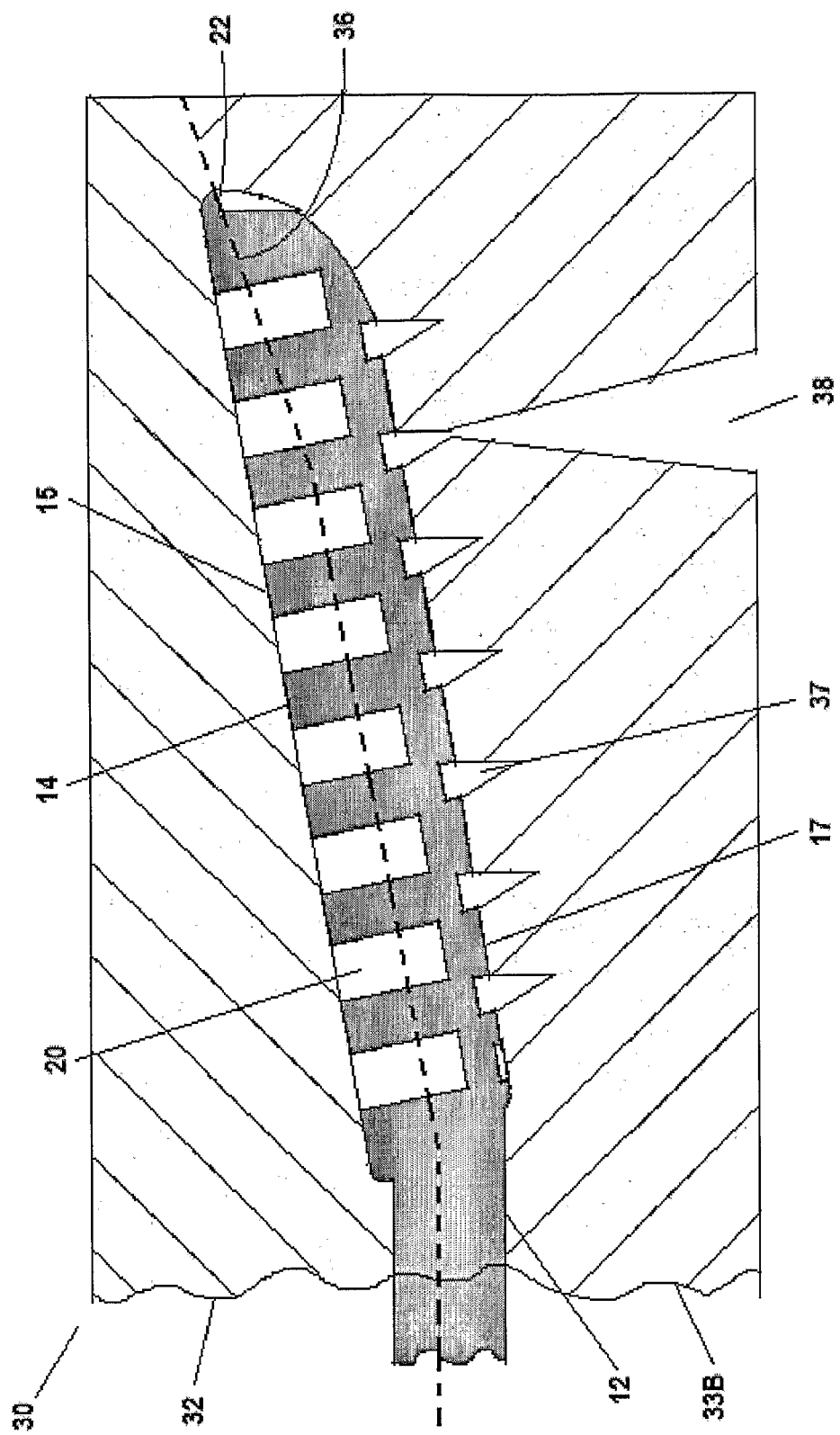
FIG. 6 Longitudinal section through an injection mould.

FIG. 5 shows a cross section through part 30 of an injection mould immediately adjacent to the mould cavity 31, and enclosing a head part 14 as shown in FIG. 1 sectioned as shown in FIG. 3B. Injection mould 30 may or may not also enclose handle 12. FIG. 6 shows a longitudinal section through the same part 30, enclosing the head part 14 as shown in FIG. 1 sectioned as shown in FIG. 3A, and shown enclosing part of handle 12. FIG. 6 shows a section cut along the line X—Y of FIG. 5.

Injection mould 30 comprises first 32 and second 33 mould blocks which include a respective first 34 and second 35 part mould cavity. Blocks 32 and 33 mate at a primary split line 36, so that the part mould cavities 34,35 combine to form the mould cavity 31. Primary split line 36 intersects the head part 14 enclosed in the cavity 31 at the edge surface 19 between the first 15 and second 17 surfaces. First part mould cavity 34 encloses the first surface 15, and the second part mould cavity 35 encloses the second surface 17 and includes a concavity 37 which defines the shape of the elastomer part 18 to be formed therein, concavity 37 being a shape complementary to the shape of the rib 110. The second mould block 33 incorporates a conventional injection moulding port 38 for introduction of a thermoplastic elastomer material into the second mould cavity 35 to thereby form the elastomer material part. The mating at line 36 is tight against escape of any elastomer material injected therein from cavity 35. FIG. 4 shows where the injection port 38 opens into the cavity 35 relative to the head part 14 enclosed therein, i.e. into a part adjacent to one of the grooves 21.

Second mould block 33 comprises two second part mould blocks 33A, 33B which mate at a second mould block split line 39. FIG. 4 shows by dashed line S——S the alignment of this split line 39, being the alignment of the toothbrush longitudinal direction A——A. It is seen that this split line 39 extends in a direction perpendicular to a plane between the first and second surfaces 15, 17, i.e. the plane of primary split line 36. This second mould block split line 39 is sufficiently wide to allow the venting of air from the second part mould cavity 35 when fluid elastomer material is injected therein but is sufficiently narrow that no fluid elastomer material may escape. Split line 39 functions as a conduit communicating between the second part mould cavity 35 and the outside of the mould block 33, in the form of a narrow slot extending in the toothbrush longitudinal direction A—A. As is seen from FIG. 4 this split line 39 provides communication between plural concavities 37 and the outside of the mould block 33.

Normally for use blocks 33A and 33B are firmly and rigidly fixed together mating at line 39, for example by means of bolts (not shown) or a surrounding frame (not shown) which clamps them together resistant to the stresses and pressures of use in the toothbrush manufacturing process. Although the mating of the blocks 33A and 33B at the line 39 is fluid-tight enough to prevent any escape of injected elastomer material via the line 39, the mating at line 39 allows air to vent from the interior of the cavity 35.

Normally the mould block 30 will be incorporated into conventional injection moulding machinery (not shown) of a type otherwise conventional in the toothbrush manufacturing art.

The blocks 32,33A,33B are made of steel and the cavities 34,35 are formed therein using a conventional process of spark erosion (or electro-discharge machining) as commonly used in the art of making toothbrush moulds.

The apparatus shown in FIGS. 5 and 6 may be used to make a toothbrush head 11 as shown in FIG. 1 by the following process.

A plastic material head part 14 as shown in FIG. 2, normally integrally made with its handle 12 and the neck part 13, is enclosed in the injection mould cavity 31, for example by first introducing the head part 14 into part mould cavity 34 in block 32, then mating block 32 with block 33 at primary split line 36 to form cavity 31 by combination of first and second part mould cavities 34, 35. The plastic material head part 14 may be introduced into the cavity 31 using manipulation procedures conventional in the toothbrush art.

Other parts of the toothbrush to be formed, e.g. the handle 12 and neck 13 need not be enclosed in the cavity 31.

When the blocks 32 and 33 have been so mated, and are held against the injection pressure of the elastomer material 18, the fluid elastomer material 18 is injected into cavity 31 via port 38. Typically Kraiburg SEBS TF3AAH may be injected in at a temperature of 250°. The fluid elastomer material 18 flows to all parts of cavity 31, including into concavity 35 to form the ribs 110, and to flow along conduit 23. It is seen that flange 22 offsets the side surface 19 from the inside wall of the mould cavity 31, so that elastomer material flows between the head part 14 and the wall of the mould to deposit the elastomer material 18 as a layer around head part 14. The port 38 communicates with one of the concavities 17 in second mould cavity 33B, and the orifice between port 38 and concavity 37 can easily be made small enough that the residual disturbance of the shape of the rib 110 is inconspicuous.

From FIG. 4 it is seen that elastomer material 18 may follow the flow paths indicated by the arrows along the grooves 21 in surface 17 of head part 14. If elastomer material follows these flow paths then it will be appreciated that unless air in the cavity 31 is able to escape via split line 39 a bubble might be formed at or near the point 40, resulting in a void in the finished product. The venting of air from the second part mould cavity 35 during introduction of the thermoplastic elastomer material 18 into the second mould cavity 35 via second mould block split line 39 reduces the possibility of voids being formed in this way.

The mould block 30 is then cooled to ca. 35°, e.g. using conventional cooling lines (not shown) within block 30, until the elastomer material 18 is solid enough to allow the mould block 30 to be opened across the primary split line 36. The head part 14 with its so-formed elastomer material part 18 may then be ejected in a conventional manner, e.g. using ejector pins (not shown) from the mould cavity 34 or 35, and then tufts 16 of bristles may be inserted into bristle holes 20 in a conventional manner.

The invention claimed is:

1. A process for making a toothbrush head for a toothbrush which comprises a head and a grip handle and having a head-handle longitudinal direction, the head having a first surface in which bristles are mounted and an opposite second surface on which there is an elastomer material part comprising plural ribs each having an elongate direction across the longitudinal direction, and extending from the second surface in a height direction perpendicular to a plane between the first and second surfaces;

said process comprising; providing a plastic material head part having the first surface in which bristles are mounted or are to be mounted, and having the opposite surface on which an elastomer material part is to be formed, enclosing the head part in an injection mould cavity formed by combination of a first and second part mould cavity formed in respective first and second mould blocks which mate at a primary split line, the injection mould cavity defining at least part of the shape of the elastomer part comprising plural ribs each having an elongate direction across the longitudinal direction, and extending from the second surface in a height direction perpendicular to a plane between the first and second surfaces to be formed, introducing a thermoplastic elastomer material into the injection mould cavity;

causing said elastomer material to flow into the injection mould cavity such that the elastomer material enters the parts of the mould cavity that define said ribs from ends of those parts which are on transversely opposite sides of the head-handle longitudinal direction to thereby form the elastomer material part;

wherein the first part mould cavity encloses at least part of the first surface and the second part mould cavity encloses at least part of the second surface and defines at least part of the elastomer part to be formed, and the second mould block comprises at least two part second mould blocks which mate at a second mould block split line which extends in the toothbrush longitudinal direction and intersects said parts of the mould cavity that define said ribs to provide communication between said parts and the outside of the mould, said second mould block split line comprising the means to allow air trapped by the elastomer material as it flows from said transversely opposite parts of the mould cavity to vent from the injection mould cavity during introduction of the thermoplastic elastomer material into the injection mould cavity other than via the primary split line.

2. Process according to claim 1, wherein the fluid thermoplastic elastomer material is injected into the injection mould cavity at a temperature of 240-260° C.

3. Process according to claim 2 wherein subsequent to the injection of the thermoplastic elastomer material into the injection mould cavity the head part with the so-formed elastomer material part is ejected from the mould cavity at a temperature between 30-40° C.

4. Apparatus for making a toothbrush head by a process according to claim 1, comprising: an injection mould which comprises first and second mould blocks which include a respective first and second part mould cavity and which mate at a primary split line, so that the part mould cavities combine to form a mould cavity suitable to enclose a plastic material head part having a first surface in which bristles are mounted or are to be mounted, and having an opposite surface on which an elastomer material part comprising plural ribs each having an elongate direction across the longitudinal direction, and extending from the second surface in a height direction perpendicular to a plane between the first and second surfaces is to be formed, the first and second surfaces being distanced by a side surface, the mould cavity defining at least part of the elastomer part to be formed;

the injection mould being provided with an injection port for introduction of a thermoplastic elastomer material into the second mould cavity via said port to thereby form the elastomer material part;

wherein the first part mould cavity is adapted to enclose at least part of the first surface and the second part mould cavity is adapted to enclose at least part of the second surface and to define at least part of the elastomer part to be formed;

said second part mould cavity having parts which define the shape of said ribs, said parts having ends which are on transversely opposite sides of the head-handle longitudinal direction, said injection port being positioned such that elastomer material injected therethrough is caused to flow into the injection mould cavity such that the elastomer material enters the parts of the mould cavity that define said ribs and is caused to flow in transversely opposite directions from said ends of those parts which are on transversely opposite sides of the head-handle longitudinal direction;

and second mould block comprises at least two part second mould blocks which mate at a second mould block split line which extends in the toothbrush longitudinal direction and intersects said parts of the mould cavity that define said ribs to provide communication between said parts and the outside of the mould, said second mould block split line comprising the means to allow air trapped by the elastomer material as it flows from said transversely opposite parts of the mould cavity to vent from the injection mould cavity during introduction of the thermoplastic elastomer material into the injection mould cavity other than via the primary split line.

5. Apparatus according to claim 4 wherein the first and second mould blocks mate at a primary split line which, when the head part is enclosed in the mould cavity, intersects the head part at the edge surface, between the first and second surfaces.

* * * * *